United States Patent
Bentley et al.

(10) Patent No.: US 12,402,744 B2
(45) Date of Patent: Sep. 2, 2025

(54) APPARATUS AND METHOD FOR PREPARING A BEVERAGE

(71) Applicant: Koninklijke Douwe Egberts B.V., Utrecht (NL)

(72) Inventors: Andrew Charles Bentley, Banbury (GB); Nicholas Andrew Hansen, Banbury (GB); Willem Johan Plantinga, Utrecht (NL); Henrik Johan Dees, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 481 days.

(21) Appl. No.: 17/414,896

(22) PCT Filed: Dec. 17, 2019

(86) PCT No.: PCT/EP2019/085750
§ 371 (c)(1),
(2) Date: Jun. 16, 2021

(87) PCT Pub. No.: WO2020/127344
PCT Pub. Date: Jun. 25, 2020

(65) Prior Publication Data
US 2022/0061578 A1    Mar. 3, 2022

(30) Foreign Application Priority Data
Dec. 21, 2018   (GB) ..................................... 1821105

(51) Int. Cl.
*A47J 31/053*    (2006.01)
*A23F 5/26*      (2006.01)
(Continued)

(52) U.S. Cl.
CPC ............... *A47J 31/053* (2013.01); *A23F 5/26* (2013.01); *A47J 31/002* (2013.01); *A47J 31/468* (2018.08)

(58) Field of Classification Search
CPC ...... A47J 31/053; A47J 31/002; A47J 31/468; A47J 31/467; A47J 31/4403; A23F 5/26
(Continued)

(56) References Cited

U.S. PATENT DOCUMENTS 5,650,186 A * 7/1997 Annoni ............... A47J 31/5255
426/231
11,134,805 B1 * 10/2021 Johnson ................ A47J 31/053
(Continued)

FOREIGN PATENT DOCUMENTS

DE    102014018381 A1 *  6/2016  ............ A47J 31/002
EP       0909542 A1 *  4/1999  .......... A47J 31/3609
(Continued)

OTHER PUBLICATIONS

International Search Report and Written Opinion, mailed Apr. 6, 2020, International Application No. PCT/EP2019/085750 (12 pgs.).
(Continued)

*Primary Examiner* — Erik Kashnikow
*Assistant Examiner* — Luis Eugenio Diou Berdecia
(74) *Attorney, Agent, or Firm* — Fitch, Even, Tabin & Flannery LLP (57) ABSTRACT

An invention as provided is a method of preparing a beverage or beverage extract comprising steps of: a. providing an extraction chamber comprising an extractable beverage material, a liquid inlet and a liquid outlet, and b. conveying a liquid into the chamber via the inlet and at least a portion of the liquid out of the chamber via the outlet, and c. conveying at least a portion of the liquid that has exited the chamber from step b) back into the chamber via the outlet
(Continued)

and conveying at least a portion of the liquid out of the chamber via the inlet, wherein steps b) and c) are repeated at least twice, and wherein at least a portion of the liquid conveyed into the chamber in at least one subsequent step b), in addition to the first step b), is conveyed into the chamber for the first time.

13 Claims, 2 Drawing Sheets

(51) Int. Cl.
    *A47J 31/00*         (2006.01)
    *A47J 31/46*         (2006.01)

(58) Field of Classification Search
    USPC .............................. 426/431, 432, 433; 99/308
    See application file for complete search history.

(56) References Cited

U.S. PATENT DOCUMENTS

| | | | |
|---|---|---|---|
| 2003/0066430 A1* | 4/2003 | Bitar | A47J 31/54 |
| | | | 99/275 |
| 2006/0096464 A1* | 5/2006 | Blanc | A47J 31/36 |
| | | | 99/279 |
| 2007/0095213 A1* | 5/2007 | Blanc | A47J 31/053 |
| | | | 99/279 |
| 2008/0276807 A1* | 11/2008 | Righetti | A47J 31/36 |
| | | | 99/302 R |
| 2009/0199721 A1* | 8/2009 | Hausslein | A47J 31/02 |
| | | | 99/302 R |
| 2009/0293733 A1* | 12/2009 | Martin | G07F 13/065 |
| | | | 99/280 |
| 2013/0022723 A1* | 1/2013 | Azzano | A23F 5/262 |
| | | | 426/433 |
| 2014/0072690 A1* | 3/2014 | Ha | A47J 31/46 |
| | | | 99/300 |
| 2014/0242226 A1* | 8/2014 | Buttiker | A47J 31/467 |
| | | | 426/433 |
| 2016/0353761 A1* | 12/2016 | Paul | A23F 5/262 |
| 2017/0119195 A1* | 5/2017 | Al-Shaibani | A47J 31/525 |
| 2017/0164780 A1* | 6/2017 | Hesselbrock | A47J 31/3638 |
| 2017/0367526 A1* | 12/2017 | Avins | A47J 31/5253 |
| 2018/0098658 A1* | 4/2018 | Angell | A47J 31/44 |

FOREIGN PATENT DOCUMENTS

| | | | | |
|---|---|---|---|---|
| EP | | 1264568 A1 * | 12/2002 | ........... A47J 31/3609 |
| EP | | 3108777 A1 * | 12/2016 | ............. A47J 31/002 |
| WO | WO-2014072552 A1 * | | 5/2014 | ............. A47J 31/053 |
| WO | WO-2018104886 A1 * | | 6/2018 | ............. A47J 31/002 |
| WO | WO-2018148828 A1 * | | 8/2018 | ............. A47J 31/053 |

OTHER PUBLICATIONS

Search Report Under Section 17(5) dated Jun. 21, 2019; Application No. GB1821105.2 (5 pgs.).

* cited by examiner

APPARATUS AND METHOD FOR PREPARING A BEVERAGE

CROSS REFERENCE TO RELATED APPLICATIONS

This application is a U.S. national phase application of International Application No. PCT/EP2019/085750, filed Dec. 17, 2019, which claims benefit from United Kingdom Application 1821105.2, filed Dec. 21, 2018, which are each hereby incorporated herein by reference in their entirety.

TECHNICAL FIELD OF THE INVENTION

The present invention relates to an apparatus and method for preparing a beverage extract and/or a beverage and, particularly, to an apparatus and method for preparing a beverage and/or a beverage extract at reduced temperatures, i.e. temperatures below about 50° C.

BACKGROUND TO THE INVENTION

There are many known systems and apparatus for the preparation of beverages and beverage extracts both in home and commercial environments. Some examples are the Tassimo®, Nespresso® and Senseo® systems. Each known system comprises an extraction chamber and means for delivering a fluid, typically water or steam, to, and through, the extraction chamber such that any extractable/soluble material within the chamber can be mixed with the fluid, usually at an elevated temperature and pressure, in order to promote the extraction of soluble components. The beverage extract or beverage then exits the extraction chamber and is delivered into a receptacle. The fluid is drawn or driven through the extraction chamber in a single pass, in prior art systems.

One goal of such systems is to generate a good quality beverage, or a range of good quality beverages, for the consumer in as short a time as is practical.

Whilst these systems are well-known in the art, there remain a number of disadvantages with the existing apparatus and methods, especially when attempting to maximise the extraction of a given volume of extractable (or soluble) material when fluid temperature and pressure or control of extractable material properties are limited. There are further limitations when attempting to use such systems to create both hot and cold beverage extracts with the same user convenience, as, often the temperature of the fluid is relied upon to promote extraction in a hot fluid system and when cold water is introduced the system cannot provide adequate extraction and/or dissolution.

One particular problem with such systems is to create a beverage extract or beverage comprising the appropriate quality and amount of extracted/dissolved material, particularly in systems where there is a fixed or small volume of extractable/soluble material or; low fluid pressure, temperature (e.g. water at less than 50° C.) and/or volume; or where the particle size or other parameters of the extractable/soluble material are not under the control of the system manufacturer or unable to be optimised for other manufacturing or consumer reasons.

Most known systems rely on the use of high pressure (e.g. water at 2 or 3 bar, 9 bar or up to 18 bar pressure) and/or high temperature fluid (e.g. 70-100° C.+ water) to increase the amount of extraction from the volume of extractable material within the extraction chamber, it would be advantageous to provide an apparatus and/or method of producing a beverage extract and or beverage that does not require high temperature and/or pressure fluid but still gives a good yield of beverage extract from the extractable material in quality and/or amount of extract. Quality in this case is usually quantified by the presence of blends of key compounds extracted into the beverage extract and/or amount of dissolution of the beverage extract and/or soluble beverage material.

Further, there remains a need in the art to increase and/or control the amount of extracted/dissolved material from a given volume of extractable/soluble material in such systems. Increasing the temperature and/or pressure of the fluid may help with further extraction at the cost of increase in the energy usage, cost to produce, potential loss of quality and inherent risk to consumer. Adjusting the particle size of the extractable/soluble material is not always possible; the geometry of the extraction chamber is usually fixed; and the residence time of any fluid in the extraction chamber is limited by the need to produce a beverage or beverage extract in seconds and minutes, certainly not hours or days; in fact, the more swiftly a beverage can be produced, the better for consumer convenience. It would be advantageous to provide a system with increased amount, rate and/or quality of extraction and/or reduced extraction time from a given extractable/soluble material without one or more of these disadvantages.

Furthermore, such known systems may also be configured to be used in conjunction with at least a portion of a soluble powder as the extractable material. In these cases, extent of dissolution of the soluble powder and time to complete dissolution can also provide challenges, especially with lower solubility powders, such as those that are densely packed and/or fat-containing. Such powders can have low dissolutions yields (i.e. less than 100% dissolution). This problem is exacerbated in systems where fluid temperature and/or pressure is limited or where the geometry of the extraction chamber cannot be not configured to the provide both perfect extraction and perfect dissolution in systems that provide the convenience of both modes of operation.

It would be advantageous to provide a system that could provide beverage extracts with improved yield; extraction time; rate of beverage production and/or extract quality.

It would be advantageous to provide a system that could provide beverage extracts with improved yield; extraction time; and/or extract quality using both hot (around 70° C. to 100° C.) or cold (less than 50° C., room temperature or below) water.

It would be advantageous to provide a system that could provide beverage extracts and/or beverages with improved yield; extraction time; and/or extract quality and beverages from at least a portion of soluble powders with improved soluble powder dissolution extent and/or time.

It would be advantageous to provide a system that could provide both a beverage extract and a beverage from at least a portion of soluble powder with improved quality; extraction time and/or improved extraction yield using both hot (around 70° C. to 100° C.) or cold (less than 50° C., room temperature or below) water.

It is therefore an aim of embodiments of the invention to mitigate or reduce a disadvantage presented by the prior art.

SUMMARY OF THE INVENTION

According to a first aspect of the invention, there is provided a method of preparing a beverage extract and/or a beverage comprising steps of:

a. providing an extraction chamber comprising an extractable beverage material, a liquid inlet and a liquid outlet, and b. conveying a liquid into the chamber via the inlet and, at least a portion of the liquid, out of the chamber via the outlet, and c. conveying at least a portion of the liquid that has exited the chamber from step b) back into the chamber via the outlet and at least a portion of the liquid out of the chamber via the inlet, wherein steps b) and c) are repeated at least twice, and wherein at least a portion of the liquid conveyed into the chamber in at least one subsequent step b), in addition to the first step b), is conveyed into the chamber for the first time.

Extractable materials include materials which are at least partially soluble, but also include materials which are fully soluble. By extraction we mean at least partial dissolution, and in some embodiments, dissolution and suspension, complete dissolution and/or extraction. It will be understood that many of the same factors and kinetics affect dissolution and extraction, and so, the elements of this invention apply equally to extractable beverage materials as soluble beverage materials and are particularly relevant to low temperature (less than 50° C.) systems as dissolution and/or extraction rates are limited by reduced temperatures.

In some embodiments, there is a further step before step b) of at least partially filling the chamber with a liquid.

In some embodiments, steps b) and c) are repeated at least 20 times, more preferably at least 50 times or between 20 and 300 or 50 and 250 times. In further embodiments, where steps b) and c) are repeated, at least a portion of the liquid conveyed in step b) comprises at least a portion of the liquid conveyed in the previous step c).

The liquid conveyed in the or each step c) will include extracted material and thus will be a solution of the extracted material, which may become a more concentrated solution when it is passed back through the extractable material during the or each step c).

Additional passes of liquid through the extraction chamber have the additional advantage of increasing the extent of and rate of extraction however the relative duration of each step b) and c) and number of repetitions can be tuned to further improve on the speed and extent of extraction.

In some embodiments at least a portion of the liquid conveyed into the chamber in at least one further step b), in addition to the first step b), is conveyed into the chamber for the first time.

Such embodiments have the particular advantage of improved extraction rate as a more dilute liquid/extract and/or solute mixture contributes to an improved extraction and/or dissolution rate over a more concentrated one.

In other embodiments each subsequent step b) conveys only liquid that has been passed through the chamber and out of the inlet in step c).

Such embodiments have the particular advantage of concentrating a portion of liquid more strongly.

In some embodiments, a larger volume of liquid is conveyed in at least one step b) than in at least one step c). In some embodiments, a larger volume of liquid is conveyed in every step b) than in every step c).

In some embodiments, the sum of the volume of liquid conveyed in all steps b) is greater than the sum of the liquid that is conveyed in all the steps c).

In some embodiments, the volume of liquid conveyed in step b) is at least 1.2 times or at least 1.3 times, preferably between 1.2 and 6 times or 1.3 and 5 times the volume of liquid conveyed in step c).

Such embodiments have the particular advantage of further improved extent of and/or rate of extraction.

In some embodiments, the temperature of the liquid that is conveyed in steps b) and/or c) is less than 50° C.; less than 40° C.; preferably less than 30° C. or between 1° C. to 50° C.; between 5° C. and 40° C. or preferably between 5° C. and 30° C.

These embodiments have the particular advantage of improved rate of extraction and reduced beverage preparation time over the methods of "cold brewing" coffee of the prior art, meaning that a consumer can experience a conveniently prepared "cold brew" coffee beverage with an improved quantity and quality of extraction without the excessively long wait associated with prior art preparation methods, such as with the overnight steeping method.

In other embodiments, the temperature of the liquid that is conveyed in steps (b) and/or c) is between 70° C. to 100° C., preferably between 75° C. to 95° C. or 75° C. to 90° C.

These embodiments have the particular advantage of improved extraction in hot beverage production and with reciprocal flowing working in combination with increased temperature to provide an improved extraction yield vs increased temperature alone.

In some embodiments, there is at least one liquid conveying means and the liquid is first drawn through the liquid conveying means before entering the chamber via the inlet, and liquid exiting the inlet in step c) does not come into contact with the at least one conveying means after it has gathered material from the extraction chamber.

Such embodiments have the particular advantage of reduced stress on the conveying means and extended pump lifetime.

In some embodiments, the volume of the extraction chamber is between 1 ml to 500 ml. In some embodiments, the volume of the extraction chamber is between 1 ml and 50 ml, between 1 ml and 40 ml; 1 ml and 30 ml or between 5 ml and 30 ml and in other embodiments the volume of the extraction chamber is between 50 ml and 500 ml or between 50 ml and 400 ml; 50 ml and 300 ml or between 75 ml and 300 ml.

Embodiments with and extraction chamber with the larger volume range have the particular advantage of improved rate of beverage extract production and capacity to produce larger quantities of extract where, embodiments with the smaller range have the particular advantage of improved consumer convenience, a shorter beverage preparation time and finer control of beverage preparation parameters such as residence time, liquid pressure and/or liquid temperature.

In some embodiments, the extractable beverage material comprises coffee, tea, cocoa, milk, creamer, soup, sugar, flavours or any combinations thereof.

In some embodiments, the total time to complete all steps b) and c) is between 30 and 400 seconds, or between 30 and 350 seconds, between 30 and 300 seconds or between 50 and 300 seconds.

According to a second aspect of the invention, there is provided a method of preparing a beverage extract and/or a beverage comprising steps of:

a. providing an extraction chamber comprising an extractable beverage material, a liquid inlet and a liquid outlet, and b. conveying a liquid into the chamber via the inlet and, at least a portion of the liquid, out of the chamber via the outlet, and c. conveying at least a portion of the liquid that has exited the chamber from step b) back into the chamber via the outlet and at least a portion of the liquid out of the chamber via the inlet, wherein a larger volume of liquid is conveyed in at least one step b) than in at least one step c).

Extractable materials include materials which are at least partially soluble, but also include materials which are fully soluble. By extraction we mean at least partial dissolution, and in some embodiments, dissolution and suspension, complete dissolution and/or extraction. It will be understood that many of the same factors and kinetics affect dissolution and extraction, and so, the elements of this invention apply equally to extractable beverage materials as soluble beverage materials and are particularly relevant to low temperature (less than 50° C.) systems as dissolution and/or extraction rates are limited by reduced temperatures.

In some embodiments, the volume of liquid conveyed in step b) is at least 1.2 times or at least 1.3 times, preferably between 1.2 and 6 times or 1.3 and 5 times the volume of liquid conveyed in step c).

Such embodiments have the particular advantage of further improved extent of and/or rate of extraction.

In some embodiments, a larger volume of liquid is conveyed in every step b) than in every step c).

In some embodiments, there is a further step before step b) of at least partially filling the chamber with a liquid.

In some embodiments, steps b) and c) are repeated at least twice, preferably at least 20 times, more preferably at least 50 times or between 20 and 300 or 50 and 250 times. In further embodiments, where steps b) and c) are repeated, at least a portion of the liquid conveyed in step b) comprises at least a portion of the liquid conveyed in the previous step c).

The liquid conveyed in the or each step c) will include extracted material and thus will be a solution of the extracted material, which may become a more concentrated solution when it is passed back through the extractable material during the or each step c).

Additional passes of liquid through the extraction chamber have the additional advantage of increasing the extent of and rate of extraction however the relative duration of each step b) and c) and number of repetitions can be tuned to further improve on the speed and extent of extraction.

In some embodiments where there are repetitions of step b), at least a portion of the liquid conveyed into the chamber in at least one further step b), in addition to the first step b), is conveyed into the chamber for the first time.

Such embodiments have the particular advantage of improved extraction rate as a more dilute liquid/extract and/or solute mixture contributes to an improved extraction and/or dissolution rate over a more concentrated one.

In other embodiments where there are repetitions of step b), each subsequent step b) conveys only liquid that has been passed through the chamber and out of the inlet in step c).

Such embodiments have the particular advantage of concentrating a portion of liquid more strongly.

In some embodiments where steps b) and c) are repeated, the sum of the volume of liquid conveyed in all steps b) is greater than the sum of the liquid that is conveyed in all the steps c).

In some embodiments, the temperature of the liquid that is conveyed in steps b) and/or c) is less than 50° C.; less than 40° C.; preferably less than 30° C. or between 1° C. to 50° C.; between 5° C. and 40° C. or preferably between 5° C. and 30° C.

These embodiments have the particular advantage of improved rate of extraction and reduced beverage preparation time over the methods of "cold brewing" coffee of the prior art, meaning that a consumer can experience a conveniently prepared "cold brew" coffee beverage with an improved quantity and quality of extraction without the excessively long wait associated with prior art preparation methods, such as with the overnight steeping method.

In other embodiments, the temperature of the liquid that is conveyed in steps (b) and/or c) is between 70° C. to 100° C., preferably between 75° C. to 95° C. or 75° C. to 90° C.

These embodiments have the particular advantage of improved extraction in hot beverage production and with reciprocal flowing working in combination with increased temperature to provide an improved extraction yield vs increased temperature alone.

In some embodiments, there is at least one liquid conveying means and the liquid is first drawn through the liquid conveying means before entering the chamber via the inlet, and liquid exiting the inlet in step c) does not come into contact with the at least one conveying means after it has gathered material from the extraction chamber.

Such embodiments have the particular advantage of reduced stress on the conveying means and extended pump lifetime.

In some embodiments, the volume of the extraction chamber is between 1 ml to 500 ml. In some embodiments, the volume of the extraction chamber is between 1 ml and 50 ml, between 1 ml and 40 ml; 1 ml and 30 ml or between 5 ml and 30 ml and in other embodiments the volume of the extraction chamber is between 50 ml and 500 ml or between 50 ml and 400 ml; 50 ml and 300 ml or between 75 ml and 300 ml.

Embodiments with and extraction chamber with the larger volume range have the particular advantage of improved rate of beverage extract production and capacity to produce larger quantities of extract where, embodiments with the smaller range have the particular advantage of improved consumer convenience, a shorter beverage preparation time and finer control of beverage preparation parameters such as residence time, liquid pressure and/or liquid temperature.

In some embodiments, the extractable beverage material comprises coffee, tea, cocoa, milk, creamer, soup, sugar, flavours or any combinations thereof.

In some embodiments, the total time to complete all steps b) and c) is between 30 and 400 seconds, or between 30 and 350 seconds, between 30 and 300 seconds or between 50 and 300 seconds.

According to a third aspect of the invention, there is provided a beverage preparation apparatus comprising a liquid conveying means and an extraction chamber comprising a liquid inlet and a liquid outlet, characterised in that the liquid conveying means is configured to convey a liquid through the chamber alternately via the inlet and the outlet.

In some embodiments, the liquid conveying means comprises at least one pump, preferably comprises one or two pumps and/or comprises one pump and a further liquid conveying means.

Embodiments with one pump have the additional advantage of reduced cost and complexity in manufacture. When using a single pump, the pump may drive the liquid in alternate directions through the extraction chamber.

In some embodiments where the liquid conveying means comprises two pumps, preferably one pump is configured to convey liquid through the extraction chamber from inlet to outlet and the other is configured to convey liquid though the extraction chamber from outlet to inlet. Such embodiments have the additional advantage of lower strain on each pump, more rapid transition from step b) to step c) and more control of the volume entering and exiting the chamber in each direction.

In embodiments where the liquid conveying means comprises one pump, the pump is configured to convey the liquid into the extraction chamber via the inlet or the outlet of the chamber or both, alternately. In embodiments where the pump is configured to convey the liquid into only one of the inlet or the outlet of the chamber the apparatus further comprises a further liquid conveying means that is not a pump.

In embodiments where the apparatus comprises a further liquid conveying means, the further liquid conveying means may be configured to at least partially reverse the flow imparted on the liquid by the pump when the pump is inactive. For example, if the pump is configured to convey liquid from inlet to outlet, the further liquid conveying means may be configured to convey liquid from outlet to inlet. The further liquid conveying means may be any suitable fluid vessel, pressure vessel or chamber such as a vessel with variable volume such as an elastic vessel that may be configured to be pressurised and/or filled by the action of the pump.

In some embodiments, the further liquid conveying means has a volume of between 1 ml and 50 ml, preferably between 1 ml and 25 ml In embodiments where the liquid conveying means comprises two pumps, preferably, a first pump is configured to convey liquid into the chamber via the inlet and a second pump is configured to convey liquid into the chamber via the outlet.

Pumps mentioned as components of the apparatus may be of any reasonable design e.g. they may convey the liquid via increasing pressure or by drawing a vacuum, may be gear pumps, pistons or of any other appropriate design.

In some embodiments, the apparatus is configured such that the liquid does not come into contact with the liquid conveying means after it has gathered material from the extraction chamber.

In some embodiments, the apparatus further comprises an attachment for connecting the apparatus to a liquid source. In further embodiments, at least a portion of, preferably all of, the liquid conveying means is positioned between the attachment to the liquid source and the inlet of the extraction chamber. In still further embodiments, there is a conduit and/or at least one reservoir between the liquid conveying means and the inlet of extraction chamber. In still further embodiments, the volume of the conduit and/or at least one reservoir is sufficient to prevent any liquid that has entered the extraction chamber from returning to the at least a portion of the liquid conveying means, in use, and/or is larger than the volume of liquid conveyed through extraction chamber from the outlet to the inlet, in use.

Such embodiments have the additional advantage of preventing contamination of the liquid conveying means by liquid that has come in to contact with the extraction chamber and in the case of the liquid conveying means being a pump, extending the life of the pump and reducing the amount of work the pump must do.

It will be understood that if it is not possible to exclude all liquid that has entered the extraction chamber from reaching the liquid conveying means in such embodiments, the intention is to provide sufficient volume of conduit and/or at least one reservoir between the extraction chamber such that the amount of liquid that has entered the extraction chamber that can return to the liquid conveying means is de minimis.

The liquid may be an aqueous medium but is preferably water.

In some embodiments the apparatus may also comprise a liquid container containing or capable of containing a liquid source, connected to the attachment for connecting the apparatus to the liquid source. Alternatively, or additionally, the liquid source may be a mains water tap or source, such as a mains water system.

According to a fourth aspect of the invention there is provided a method of the first or the second aspect of the invention using the apparatus of the third aspect of the invention.

DETAILED DESCRIPTION OF THE INVENTION

In order that the invention may be more clearly understood embodiments thereof will now be described, by way of example only, with reference to the accompanying drawings, of which.

Figure 1:
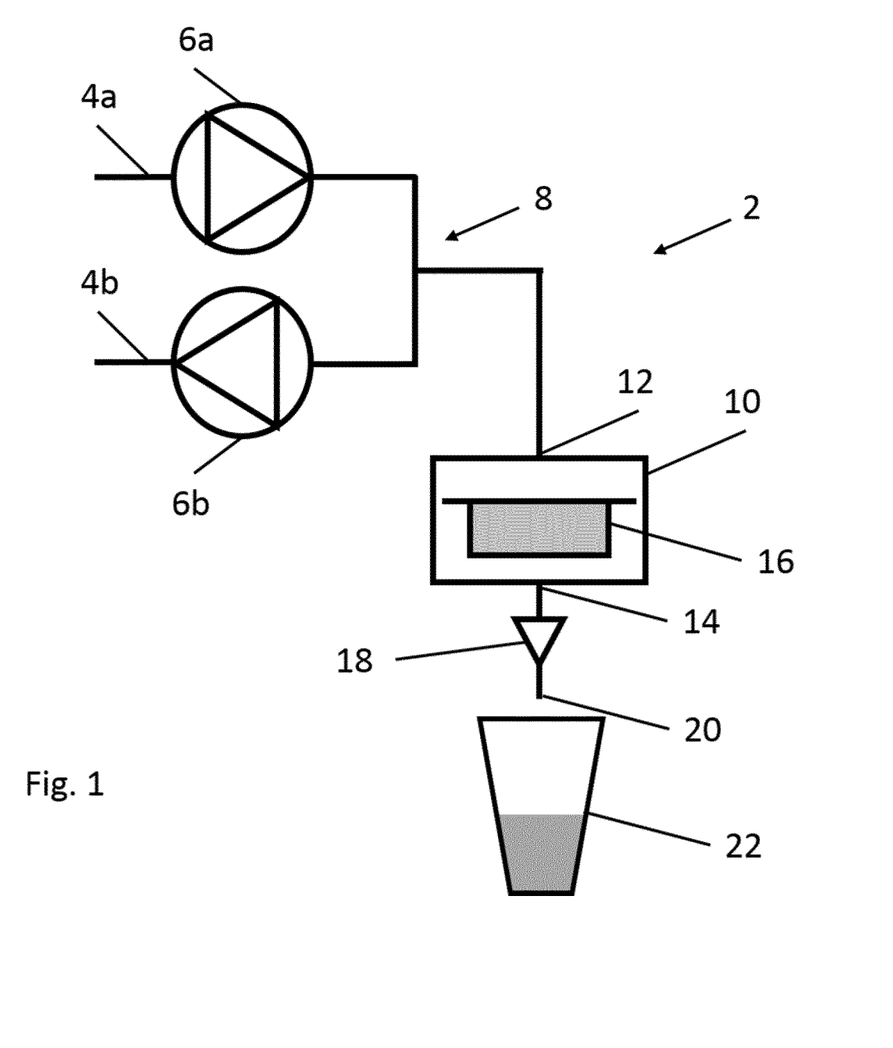
FIG. 1 Is a schematic of a first embodiment of an apparatus of the third aspect of the invention for use with the method of the first or second aspects of the invention.

FIG. 1 shows a schematic of a first beverage preparation apparatus (2) comprising a connection to a liquid source in the form of pipes (4a and 4b); a liquid conveying means, in the form of a first and second pump (6a and 6b, respectively) connected to an extraction chamber (10) by a connection conduit (8) between and from the first and second pump (6a and 6b, respectively). The extraction chamber (10) comprises a liquid inlet (12) connected to the conduit (8) at the top of the chamber (10) and a liquid outlet (14) at the bottom of the chamber (10) and further includes an extractable beverage material (16) removably housed within the chamber (10). There is also a liquid flow restriction (18) connected to the distal, free end of the outlet (14) of the chamber (10); a beverage dispensing outlet (20) at the downstream end of the liquid flow restriction (18) and a beverage receptacle (22) beneath the beverage dispensing outlet (20).

In use, the first pump (6a) delivers liquid via conduit (8) to the inlet (12) of the extraction chamber, through the extraction chamber (10) and out of the outlet (14). Some, but not all, of the liquid flows through the flow restriction (18) and out of the beverage dispensing outlet (20), and into the receptacle (22). The second pump (6b) then draws at least a portion of the liquid still within the flow restriction (18), outlet (14) and/or dispensing outlet (20) back into the extraction chamber via the outlet (14), through the extraction chamber (10), out of the inlet (12) and into the conduit (8). The action of the first and second pumps are substantially mutually exclusive and successive, resulting in liquid being driven into and out of the chamber (10) reciprocally. The flow restriction (18) is configured to control an elevated pressure in the chamber (10) during the action of the liquid conveying means (6a and 6b).

Figure 2:
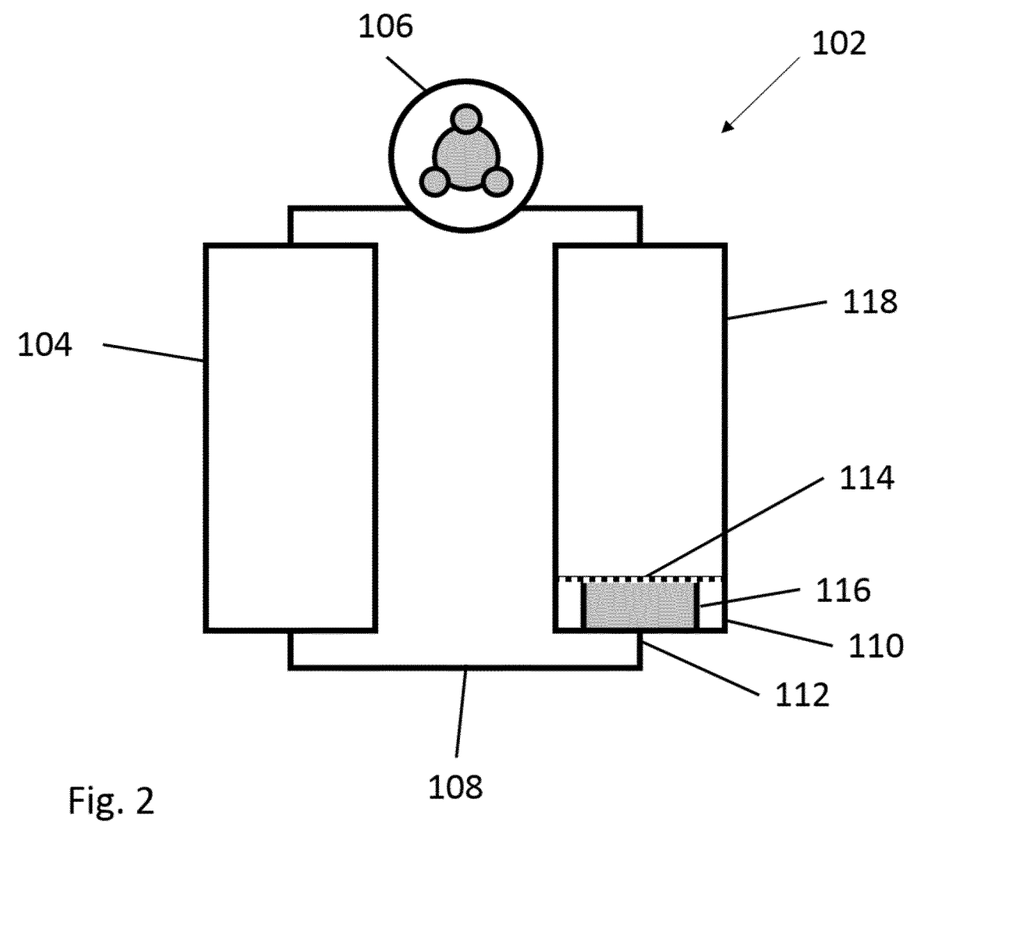
FIG. 2 Is a schematic of a second embodiment of an apparatus of the third aspect of the invention for use with the method of the first or second aspects of the invention.

FIG. 2 shows a schematic of a second beverage preparation apparatus (102) comprising a liquid source, in the form of a water chamber (104); comprising a connection in the form of conduit (108), between the water chamber (104), and an extraction chamber (110) via an inlet (112) on the bottom thereof. The extraction chamber (110) also comprises a combined outlet and flow restrictor, in the form of a filter (114), on the upper side of the extraction chamber (110) and further includes an extractable beverage material (116) within the extraction chamber (110). The extraction chamber (110) is contiguous with a liquid reservoir (118) fluidly connected via the filter (114). An air pump (106) is operably connected to and between both the water chamber (104) and liquid reservoir (118).

In use, the water chamber (104) is filled with water and the extraction chamber (110) is loaded with extractable beverage material (116). The pump (106) is turned on and drives air into the water chamber (104), conveying water via the conduit (108) to the inlet (112) into the extraction chamber (110), through the extractable beverage (116) and through the filter (114) into the liquid reservoir (118). The pump is then reversed and air is driven into the liquid reservoir (118) conveying at least a portion of the solution of extracted beverage material from the liquid reservoir (118) via the filter (114), back into and through the extraction chamber (110), out of the inlet (112) and into the water chamber (104) via the conduit (108).

In both embodiments of FIGS. 1 and 2, the liquid/water may be conveyed through the extraction chamber in alternate directions multiple times by manipulating the pumps (6a, 6b) or air pump (106) respectively. In this regard solubilised extracted beverage may be conveyed back into the extraction chamber (10, 110) multiple times, increasing the concentration of extractable beverage material in at least a portion of the liquid/water which is dispensed into the receptacle (22) of the apparatus (2) of FIG. 1 or which is desired in the water chamber (104) of the apparatus (102) of FIG. 2.

Example 1

A beverage preparation apparatus was set up as shown in the schematic diagram of FIG. 1, the first apparatus of the invention.

A Senseo Classic pad containing 7 g of roast and ground coffee (as extractable beverage material) was loaded into the extraction chamber (10) and a water reservoir (not shown) was connected to the pumps (6a and 6b) via the pipes (4a and 4b) for each test. Two different pump regimes were operated for the tests, each with 3 phases, and various temperatures of water were used. The pump regimes are shown in Tables 1, 2 and 3, the phases followed sequentially until the end of phase 4 when beverage preparation was complete.

TABLE 1

Pump regime: RCP-01
Pump regime: RCP-01 (Total brew time: 73 seconds)

| Phase | Number of cycles | First pump (6a) (ms) | Second pump (6b) (ms) |
|---|---|---|---|
| 1 | 1 | 1000 | 0 |
| 2 | 62 | 750 | 200 |
| 3 | 1 | 600 | 0 |

TABLE 2

Pump regime: RCP-02
Pump regime: RCP-02 (Total brew time: 122 seconds)

| Phase | Number of cycles | First pump (6a) (ms) | Second pump (6b) (ms) |
|---|---|---|---|
| 1 | 1 | 1000 | 0 |
| 2 | 168 | 400 | 200 |
| 3 | 1 | 400 | 0 |

TABLE 3

Pump regime: RCP-03
Pump regime: RCP-03 (Total brew time: 140 seconds)

| Phase | Number of cycles | First pump (6a) (ms) | Second pump (6b) (ms) |
|---|---|---|---|
| 1 | 1 | 2500 | 0 |
| 2 | 150 | 400 | 300 |
| 3 | 1 | 12000 | 0 |

In these examples the flow rate of each pump is largely the same with volume of liquid conveyed directly proportional to the duration of pumping.

Phase 1 of the regime was designed to 'wet' the coffee bed and fill the extraction chamber.

Phase 2 of the regime was designed to generate turbulence and mixing and promote extraction. In Phase 2, the first pump (6a) was arranged to pump water into the extraction chamber (10) via the inlet (12) and through the extractable beverage material (16), such that at least a portion of the, now solubilised material (16) exited the outlet (14). At this point, the second pump (6b) actuated to withdraw a portion of the solubilised extractable beverage material back through the outlet (14), and into the extraction chamber (10), displacing at least some of the liquid within the chamber back through the inlet (12) out of the chamber (10). This reciprocal action, where more liquid was pumped via the first pump (6a) than the second pump (6b), was repeated another 61, 167 or 149 times, and resulted in an overall larger volume of liquid in the forward direction through the chamber (10) than the backward direction, and an overall dispensing of the beverage through the restrictor (18) and out of the dispensing outlet (20) into the receptacle (22). The reciprocal flow ensured that a major portion of the liquid flowing through the chamber (10) entered the chamber (10) multiple times, to concentrate extractable beverage material (16) within the portion of liquid.

Phase 3 of the regime was designed to flush the system, reach required brew volume and reset the system for its next use. In Phase 3, fresh water was conveyed by the first pump (6a) through the chamber (10), through the inlet (12) and out of the outlet (14) then through the restrictor (18) and into the receptacle (22)

Without wishing to be bound by theory, the inventors believe that the duration of action of the second pump (or conveying means that returns the flow of liquid through the outlet of the chamber to the inlet) must be sufficient in duration and/or force to reverse the pressure generated by the operation of the first pump and to overcome the resistance of the flow restriction in the system and as a result there is a minimum required force/duration of effort in the outlet to inlet direction.

Parameters and results of the tests performed for Example 1 are shown below in Table 4.

TABLE 5

Parameters and results of tests on apparatus of Example 1 of the invention

| Test # | Pump regime | Water temperature (° C.) | Dry matter in final beverage (g/ml) | Brew yield (%) |
|---|---|---|---|---|
| 1 | RCP-01 | 12 | 0.68 | 12.4 |
| 2 | RCP-01 | 21 | 1.02 | 16.9 |
| 3 | RCP-01 | 85 | 1.54 | 26.5 |
| 4 | RCP-02 | 12 | 1.03 | 17.5 |
| 5 | RCP-02 | 21 | 1.29 | 21.4 |
| 6 | RCP-02 | 85 | 1.46 | 28.7 |
| 7 | RCP-03 | 21 | 1.31 | 21.7 |

A comparative example was also performed using the pump regime COMP-01 of Table 6, Comparative example 1. Comparative example 1 was the performed in the same way as the examples above and differed only in that only a single pump (of the same type as in Example 1) was used to water convey in one direction only through the inlet (12) of the extraction chamber (10) and out of the outlet (14). Comparative example 1 was an example of the single-pass extraction of the prior art using the same amount and type of roast and ground coffee as used in Example 1 of the invention.

TABLE 6

Pump regime: COMP-01
Pump regime: COMP-01 (Total brew time: 57 seconds)

| Number of cycles | First pump (6a) (ms) | Second pump (6b) (ms) |
|---|---|---|
| 1 | 57000 | 0 |

Table 7 shows the results of Comparative example 1 using water at 12° C., 21° C. and 85° C. Comparative example 1 shows that there is significantly lower extraction yield at all temperatures tested vs the beverage preparations of the invention, with lower temperatures (12° C. and 21° C.) showing the most marked difference.

TABLE 7

Parameters and results of Comparative example 1

| Test # | Pump regime | Water temperature (° C.) | Brew yield (%) |
|---|---|---|---|
| 1 | COMP-01 | 12 | 8.2 |
| 2 | COMP-01 | 21 | 12.7 |
| 3 | COMP-01 | 85 | 25.3 |

Brew yield is calculated as the percentage of the dry mass of the extractable beverage material that is lost to the liquid during beverage preparation.

Water temperature was measured as an indicative temperature of the prepared beverage so the temperature of the fresh water was within a few degrees C. of this temperature.

The average beverage weight from all tests in Table 3 and in Comparative example 1 was 122 g and was the final weight of the beverage after the brew cycle had completed.

The tests showed that at a range of temperatures the extent of extraction was substantially increased using embodiments of the invention compared to the prior art and in comparison to the Comparative example 1. The tests also showed that at the lower temperatures tested, that the RCP-02 pump regime was slightly better than the RCP-01 regime.

Example 2

A beverage preparation apparatus was set up as shown in the schematic diagram of FIG. 2, the second apparatus of the invention.

50 g of roast and ground coffee having particle size X50 of 400 microns and 7% fines (particles of less than 40 microns) was added to the extraction chamber (110) and 1 liter of water at 100° C. was added to the water chamber (104). The pump (106) was operated to convey the liquid into the beverage reservoir (118) via inlet (112) the extraction chamber (110) and the filter (114) and then reversed to convey the liquid in the reverse direction back into the liquid source/beverage chamber (104) in a total of 3 minutes and 30 seconds. The resulting liquid was then poured from the water chamber (104) via a spout (not shown). The resulting liquid contained 1.29% soluble solids.

Various comparative systems of the prior art were operated as per the manufactured instructions to prepare coffee beverages using the same coffee as was used in the second apparatus of the invention with the parameters and performance of those systems shown below in table 5

TABLE 5

Comparative examples of coffee preparation apparatus vs the preparation apparatus of the invention

| | Kenwood CM651 | Morphy Richards 47001 Café Rico | Cuisinart DGB600BCU | Mr Coffee Drip filter | Second embodiment of the apparatus of the invention (FIG. 2) |
|---|---|---|---|---|---|
| Volume of beverage prepared (ml) | 854 | 894 | 917 | 868 | 1000 |
| Mass of coffee in extraction chamber (g) | 180 | 135 | 140 | 143 | 50 |
| Final beverage temperature (° C.) | 78 | 72 | 78 | 75 | 79 |
| Brew time (min) | 7 | 5.45 | 7 | 8 | 3.5 |
| Soluble solids in final beverage (%) | 1.394 | 1.047 | 1.43 | 1.4 | 1.298 |

TABLE 5-continued

Comparative examples of coffee preparation apparatus vs the preparation apparatus of the invention

|  | Kenwood CM651 | Morphy Richards 47001 Café Rico | Cuisinart DGB600BCU | Mr Coffee Drip filter | Second embodiment of the apparatus of the invention (FIG. 2) |
|---|---|---|---|---|---|
| Volume of beverage produced per minute (ml/min) | 122 | 155 | 131 | 108.5 | 285 |

The results show a dramatic improvement over the prior art in the preparation time for the coffee extract with only small reduction in the total soluble solids extracted during the process using only a fraction of the amount of roast and ground coffee in the extraction chamber of the second apparatus of the invention. The second embodiment of the apparatus of the invention is able to produce a coffee beverage at a rate of 124.7 ml/min faster than the average rate of production of the apparatus of the prior art.

The above embodiment is/embodiments are described by way of example only. Many variations are possible without departing from the scope of the invention as defined in the appended claims.

The invention claimed is:

1. A method of preparing a beverage or beverage extract comprising steps of:
   a. providing an extraction chamber comprising an extractable beverage material, a liquid inlet and a liquid outlet,
   b. providing a liquid conveying means comprising at least one pump configured to convey a liquid through the extraction chamber alternately via the liquid inlet and the liquid outlet, the pump having a pump inlet and a pump outlet,
   c. conveying a liquid into the extraction chamber via the liquid inlet and at least a portion of the liquid out of the extraction chamber via the liquid outlet,
   d. dispensing a portion of the liquid that has exited the extraction chamber from step c); and
   e. conveying a portion of the liquid that has exited the extraction chamber from step c) back into the extraction chamber via the liquid outlet and conveying at least a portion of the liquid conveyed back into the extraction chamber out of the extraction chamber via the liquid inlet;
   wherein in steps c) and e) the liquid does not come into contact with the liquid conveying means after the liquid has gathered material from the extraction chamber and the liquid does not flow into the pump outlet.

2. The method of claim 1 wherein steps c) and d) are repeated at least 20 times.

3. The method of claim 1 wherein each subsequent step c) conveys only liquid that has been through the extraction chamber and out of the liquid inlet in step d).

4. The method of claim 1 wherein a larger volume of liquid is conveyed in at least one step c) than in at least one step d).

5. A method of preparing a beverage or beverage extract as recited in claim 1, wherein a larger volume of liquid is conveyed in at least one step c) than in at least one step d).

6. The method of claim 5 wherein the volume of liquid conveyed in said at least one step c) is at least 1.2 times the volume of liquid conveyed in said at least one step d).

7. The method of claim 5 wherein steps c) and d) are repeated at least twice.

8. The method of claim 7 wherein steps c) and d) are repeated at least 20 times.

9. The method of claim 7 wherein at least a portion of the liquid conveyed into the extraction chamber in at least one subsequent step c), in addition to the first step d, is conveyed into the extraction chamber for the first time.

10. The method of claim 7 wherein each subsequent step c) conveys only liquid that has been through the extraction chamber and out of the liquid inlet in step d).

11. The method of claim 5 wherein there is a further step before step c) of at least partially filling the extraction chamber with a liquid.

12. The method of claim 5 wherein the liquid has a temperature of less than 50° C.

13. The method of claim 5 wherein the volume of the extraction chamber is between 1 ml and 500 ml.

* * * * *